A. COHN.
LEATHER AUTOMOBILE TIRE.
APPLICATION FILED JAN. 31, 1916.
1,232,657.
Patented July 10, 1917.
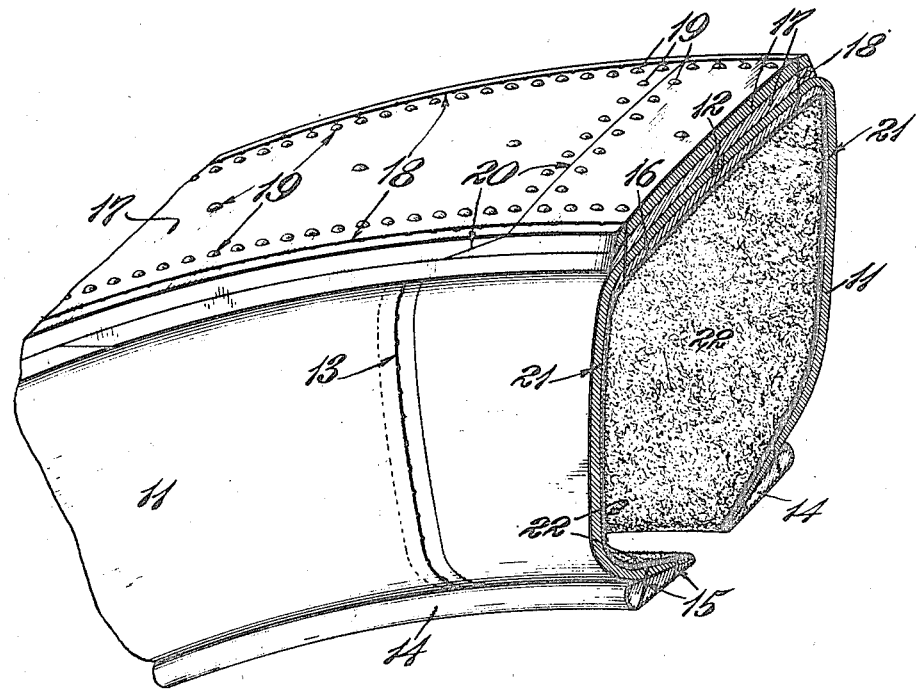
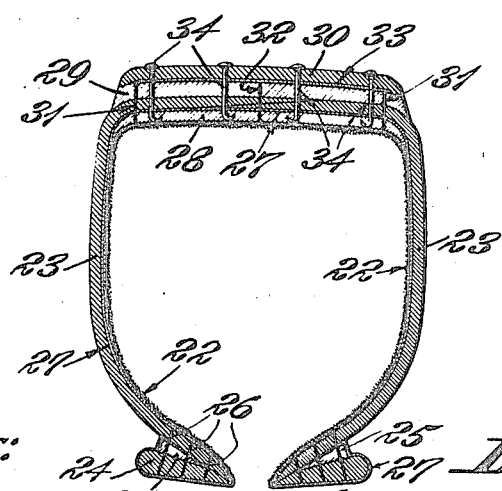

UNITED STATES PATENT OFFICE.

ABRAHAM COHN, OF ST. LOUIS, MISSOURI.

LEATHER AUTOMOBILE-TIRE.

1,232,657. Specification of Letters Patent. Patented July 10, 1917.

Application filed January 31, 1916. Serial No. 75,199.

*To all whom it may concern:*

Be it known that I, ABRAHAM COHN, a resident of the city of St. Louis and State of Missouri, have invented a new and useful Improvement in Leather Automobile-Tires, of which the following is a specification.

This invention relates to the outer casings of pneumatic tires of the clencher type, but it is not restricted to clencher tires. The objects of the invention are to cheapen the cost of the outer casings of pneumatic tires and to prolong their life by making them of leather instead of the vulcanized rubber or rubber and canvas vulcanized together which has been used heretofore. A further object of the invention is a tire casing which can be repaired at any shoe repair shop with the tools and appliances commonly used for repairing shoes.

The invention consists of an outer casing of pliant leather to which is attached a substantially flat tread of harder leather. The invention further consists in a strip or bead of leather sewed to the edge of each side wall of the casing on its outer face to provide means for securing the casing to an ordinary clencher rim. The invention further consists in the details of construction of the tire shown in the accompanying drawings and hereinafter described; and what the invention consists in is more particularly defined in the appended claims.

In the drawings, in which the same reference characters are used to designate the same parts in both views, Figure 1 is a perspective view, partly in section, of a portion of a tire embodying the invention; and Fig. 2 is a cross-sectional view showing another form of the same invention.

The tire shown in Fig. 1 of the drawings consists of two side walls 11, which are made each of a single thickness of leather. The outer margins of two side walls 11 are flanged toward each other and extend under the tread of the tire and meet. The side walls are secured together at the meeting edges of their flanges by a series of stitches 12, thereby forming a circular channel shape casing with its open side facing inward. Each side wall 11 is composed of a number of strips, the ends of which are skived and overlapped and held together by cement and lines of stitches 13.

The free marginal edges of the side walls 11 are skived off thin, and a bead strip 14 is secured along the outer face of each thinned edge. One edge of the bead strip is skived thin and arranged alongside of and coextensive with the thinned edge of the side wall which carries it; and the other edge of the bead strip is rounded to fit the hook shape of the clencher rim for which it is intended. The bead strips 14 are cemented to the side walls 11, and are also sewed to the side walls by two rows of stitches 15.

The tread portion of the tire is reinforced on the inside by a strip 17 of thin leather, and on the outside by the tread 17 made of overlapping strips of hard leather which are arranged around the periphery of the tire to break joints. In Fig. 1 this tread 17 is shown as comprising two thicknesses of leather. The tread 17 is secured along each edge to the side walls by a row of stitches 18, which go through the inner strip 16. Nails 19 are driven in rows parallel to the stitches through the tread and side walls, and are clenched in the inner strip 16. These nails may have hobnail heads or button heads in order to provide a rough surface for affording traction on smooth roads. The joints 20 in the pieces of leather which make up the tread are scarfed and nailed across the tread.

A piece of strong canvas 21, waterproofed in any suitable manner, is pasted on the inside of the tire, covering the entire inner surface thereof, and the edges of the canvas are carried around the bead strips and caught in by the stitches 15 which secure the bead strips to the sides of the casing. A lining 22, preferably made of cloth having a soft, fleecy inner face, is pasted inside of the canvas 21 for the inner tube to bear against. The tire shown in Fig. 2 of the drawings is similar to that shown in Fig. 1 in material and in manner of making. The side walls 23 extend under the tread and their meeting edges are skived and overlapped, the lapped edges being cemented. The bead strips 24 are made of hard leather, and thin strips 25 of pliable leather are arranged between the bead strips and the edges of the side walls. The bead strips 24 and filler strips 25 are secured to the side walls of the casing by means of three lines of stitches 26. The canvas lining 27 for the casing is carried around the rounded edges of the bead strips and caught between the filler strips and the side walls of the casing.

The tread consists of a thin lining strip 28 and an outside strip 29 of pliable leather arranged around the periphery of the casing. An outer tread 30 of hard leather or rubber is secured on the outside strip 29. The lining 28 and outside strip 29 are secured to the side walls by marginal rows of stitches 31 which pass through the casing and lining strip 28 under the tread 30. A middle row of stitches 32 passes through the lapped edges of the side walls 11 and secures them together and to the lining and outside strip. A strip of waterproof material 33 covers the stitches 31 and 32 and prevents entrance of water into the casing at these points. The tread is cemented to the casing, and is also held on by nails 34 which may be driven through the walls 11 of the casing and clenched in the lining strip 28. The heads of the nails project through the tread and may be cut off to permit removal of the tread, whereby a worn or cut portion of the tread may readily be ripped off and a new tread put on, without disturbing the stitches which secure the foundation portion of the casing together.

It is evident from the preceding description that the tire is simple in construction, and that it may easily be repaired in case of need by merely cutting out the injured portion and inserting a suitable piece of leather. This can be done by hand by any shoemaker or shoe repairman without difficulty. The flat tread is sufficiently crowning to take the wear off of its edges and hence save the stitches, but it is not crowned enough to change its cross-sectional shape appreciably under ordinary loads. Hence, there is very little tendency toward weaving of one layer of leather on another in the tread portion, and such as exists is restrained by the rows of stitching and the nails. The side walls of the casing are flexible and permit the tread portion to spring in against the air pressure to cushion the wheel as it passes over uneven ground.

The invention is not restricted to the precise configuration of the tire and details of construction shown and described.

I claim the following as my invention:

1. A pneumatic tire comprising an outer casing of a single layer of pliant leather having a substantially flat periphery and means along its marginal edges for attaching it to a rim, a substantially flat inner tread of leather secured to said periphery, said inner tread consisting of overlapping strips sewed together and to the casing along their edges, and a substantially flat tread of hard leather nailed to said inner tread, whereby portions of said tread can be renewed by a shoe repairman.

2. A pneumatic tire comprising an outer casing of a single layer of pliant leather having a substantially flat periphery and means along its marginal edges for attaching it to a rim, an inner strip of leather around the inside of the tread portion, and a tread of hard leather secured to its periphery by nails clenched through the casing and inner strip, whereby said inner strip and nails can be removed together without injuring said outer casing in case said tread becomes detached.

3. A pneumatic tire comprising an outer casing of a single layer of pliant leather having a peripheral seat for a tread and means along its marginal edges for attaching it to a rim, an inner strip of leather around the inside of the seat portion, and a tread of hard leather secured upon said seat portion by nails clenched through the casing and inner strip, said nails having heads projecting beyond the surface of the tread whereby they may be cut off to permit replacement of portions of the tread without injuring said casing.

4. An outer casing for a double tube pneumatic tire comprising two side walls and a tread composed of strips of leather, the side walls of said casing being pliant leather with their outer margins formed into flanges meeting under the tread of the tire and having hard leather bead strips along their inner margins for attaching the tire to a rim, the meeting flanges together forming a flat seat for the tread, and the tread being hard leather substantially flat on the periphery and held in shape by rows of nails driven into the flange portions of the side walls.

5. An outer casing for a double tube pneumatic tire, the side walls of said casing being pliant leather and having inwardly extending flat flanges around their peripheries, an inner strip of leather lapping inside said flanges along its edges, and an outer strip of leather lying flat across the tread and secured to said flanges and to said inner strip.

6. An outer casing for a double tube pneumatic tire, the side walls of said casing being pliant leather and having inwardly extending flat flanges around their peripheries, an inner strip of leather lapping inside said flanges along its edges, and an outer strip of leather lying flat across the tread and secured to said flanges and to said inner strip, and a tread secured to said outer strip by means separate from the means for securing said strips to said flanges.

Signed at St. Louis, Missouri, this 28th day of January, 1916.

A. COHN.